United States Patent [19]

Koenck

[11] Patent Number: 5,675,232

[45] Date of Patent: *Oct. 7, 1997

[54] BATTERY PACK INCLUDING ELECTRONIC POWER SAVER

[75] Inventor: Steven E. Koenck, Cedar Rapids, Iowa

[73] Assignee: Norand Corporation, Cedar Rapids, Iowa

[*] Notice: The term of this patent shall not extend beyond the expiration date of Pat. No. 5,204,608.

[21] Appl. No.: 643,392

[22] Filed: May 6, 1996

Related U.S. Application Data

[63] Continuation of Ser. No. 420,000, Apr. 7, 1995, abandoned, which is a continuation of Ser. No. 384,570, Feb. 6, 1995, abandoned, which is a continuation of Ser. No. 19,462, Feb. 18, 1993, abandoned, which is a continuation-in-part of Ser. No. 433,076, Nov. 7, 1989, Pat. No. 5,204,608.

[51] Int. Cl.$^6$ ............................... H01M 10/46; H02J 7/00
[52] U.S. Cl. ........................... 320/2; 320/13; 307/150; 429/99
[58] Field of Search ............................... 320/2, 13, 6, 15, 320/39; 429/96, 97, 98, 99, 100; 307/150

[56] References Cited

U.S. PATENT DOCUMENTS

| | | | |
|---|---|---|---|
| 3,967,979 | 7/1976 | Kaye | 429/99 |
| 4,002,892 | 1/1977 | Zielinski | 307/150 X |
| 4,121,115 | 10/1978 | DeMere | 307/150 |
| 4,308,609 | 12/1981 | Tamaki. | |
| 4,455,523 | 6/1984 | Koenck. | |
| 4,514,477 | 4/1985 | Kobayashi | 429/98 |
| 4,563,627 | 1/1986 | Orban | 320/2 X |
| 4,629,964 | 12/1986 | Ball. | |
| 4,724,189 | 2/1988 | Chase. | |
| 5,204,608 | 4/1993 | Koenck | 320/2 |
| 5,323,100 | 6/1994 | Iketani. | |
| 5,396,162 | 3/1995 | Brilmyer | 320/2 |

FOREIGN PATENT DOCUMENTS 2160374  6/1985  United Kingdom.

OTHER PUBLICATIONS

Author: Reg Moore; Title: Safe Batteries Charging Ahead; Date: Jul., 1985; Relevant Pages: vol. 17, No. 7, pp. 43–44 Place of Publication: Control and Instrumentation.

Author: Proctor; Title: Micropower ICs Conserve Power In Linear Systems; Date: Jun., 1986; Relevant Pages: vol. 34, No. 14, pp. 129–134; Place of Publication: Electronic Design.

Primary Examiner—Edward Tso
Attorney, Agent, or Firm—Suiter & Associates PC

[57] ABSTRACT

A housing of a battery pack contains in addition to standard power cell elements a voltage converter. The voltage converter is interposed between the power cell elements and external output contacts of the housing. The voltage converter regulates the output voltage applied to the output contacts of the battery pack, such that the supply voltage of the battery pack remains at a predetermined value which is independent of the voltage supplied by the power cell elements to the voltage converter and does not vary over the discharge cycle of the power cell elements. Excess battery voltage available particularly during the initial portion of the discharge cycle of the power cell elements is efficiently converted to the predetermined output voltage value which reduces the overall current delivered by the power cells to extend the useful life of the battery pack between charges.

63 Claims, 2 Drawing Sheets

BATTERY PACK INCLUDING ELECTRONIC POWER SAVER

CROSS REFERENCE TO RELATED APPLICATIONS

This is a continuation of application U.S. Ser. No. 08/420,000, filed on Apr. 7, 1995 now abandoned, which is a continuation of U.S. Ser. No. 08/384,570, filed Feb. 6, 1995, (abandoned), which in turn is a continuation of U.S. Ser. No. 08/019,462, filed on Feb. 18, 1993 (abandoned), which in turn is a continuation-in-part of U.S. Ser. No. 07/433,076, filed 7 Nov. 1989, now U.S. Pat. No. 5,204,608, issued 20 Apr. 1993.

TECHNICAL FIELD

The invention relates generally to batteries and particularly a battery pack including an electronic power saver circuit for extending battery service and charge life.

BACKGROUND

Preferred uses for electrical and electronic type equipment are evolving more and more into those which are typically referred to as "portable" uses. Much of today's electronic equipment includes portable power sources. Portable power sources may be, for example, solar power cells. The most conventional type of portable power sources for a majority of portable electric and electronic type utilization devices are batteries.

Batteries are classifiable broadly into non-rechargeable or expendable and rechargeable battery types. In each of these two categories there are batteries which differ by electrical characteristics, such as their nominal operating voltage, and by physical characteristics, such as their size, for example. In addition, batteries do not have a completely constant voltage output over the span of a discharge cycle. Depending on the type of battery involved, certain characteristics, such as charge-related voltage changes occur as the respective batteries experience a steady power drain over a single discharge cycle. Certain batteries, such as NiCad batteries, exhibit a more constant voltage output over a substantial portion of the discharge cycle than, for example, lithium type batteries.

For an electronic device to use the power of the battery over the battery's full discharge cycle, the minimum supply voltage of the battery must exceed the supply voltage requirements of the device over the entire discharge cycle of the battery. Batteries typically are rated at such a minimum voltage level, such that during the life cycle of a battery, the output voltage of the battery exceeds the nominal, rated voltage level.

Some electronic circuits of electronic devices can accept the excess voltage output by the battery without a problem. The circuits of other devices need to be protected from voltages which exceed a certain design voltage by a percentage of the nominal voltage, such as, for example, ten percent of the rated voltage. A voltage regulating circuit is consequently interposed between the power terminals of an electronic device and the particular circuit elements to be protected from an over voltage.

An exchange of batteries in an electronic device, involving the substitution of a different type of battery, though of the same nominal voltage rating, may change the impedance of the power train and affect the operation of the circuit, even in the presence of protection circuits. Thus, typically, devices are not only designed for certain supply voltage levels, but are also restricted to the use of certain types of batteries.

Lithium type batteries are particularly distinctive in their characteristic life cycle voltage output performance, in that the voltage output of lithium type batteries varies over a single discharge cycle more than for example nickel-cadmium type batteries, the latter at a relatively constant voltage throughout most of their discharge cycle and drop off relatively sharply only when substantially discharged. While there are advantages to using lithium type batteries, the relatively wide voltage swing with respect to other type batteries over a discharge cycle of the lithium batteries present designers with greater problems in controlling the excess available power caused by the initially greater available voltage. These problems have caused designers to shy away from specifying lithium type batteries for certain applications in which tight voltage controls are required.

Those electronic devices which include voltage protection circuits may cause higher power batteries to appear as less efficient power choices. If, for example, the protection circuits are dissipative power regulating circuits, a substantial part of the excess power may be dissipated or slowly drained by the protection circuits in effecting regulation of the supply voltage. The power drainage can often significantly diminish the life cycle or discharge cycle of the respective battery, making the battery appear to be less efficient than a comparable battery requiring less regulation over its discharge cycle.

Switching type regulators are more efficient in effecting regulation of the input voltage to a device. However, a battery supplier, for example has no control over the type of regulator that is going to be used for a particular device to be powered by one of the supplied batteries. Hence, lithium type batteries cannot readily be taken as replacements for similarly rated batteries, in that the economic value of the battery to the consumer may be substantially diminished because of the existence of a dissipative voltage regulator circuit in a particular electronic device. If such batteries are, nevertheless, used as a replacement device, the image of the lithium batteries as a useful product may be affected detrimentally.

SUMMARY OF THE INVENTION

The present invention seeks to overcome problems associated with an inability of controlling applications of batteries with greater voltage swings. It is, consequently, an object of the invention to provide an electronically controlled voltage at the power terminals of the battery pack. It is a further object of the invention to optimize the output voltage of the battery to the design voltage of a utilization device over substantially the entire discharge cycle of the battery.

A battery pack or power pack in accordance with the present invention includes a housing within which is disposed an electrical power storage cell. The storage cell has typical positive and negative output terminals. The housing further has power output terminals of the power pack disposed at an outer surface of the housing and adapted to become connected to a utilization device. A voltage control circuit is disposed within the housing and is electrically coupled between the output terminals of the storage cell and the power output terminals of the power pack. However, the voltage control circuit may be disposed within the battery utilization device. The voltage control circuit includes a control reference voltage and feedback means for sensing power requirements at the power output terminals of the power pack. The power requirements are sensed as a voltage variation at the power output terminals with respect to the reference voltage. The control circuit further includes a switch for selectively isolating the power terminals of the storage cell from the power output terminals of the power pack in response to a sensed power requirement at the power output terminals which is less than a power drainage capacity available at the output terminals of the storage cell.

According to another embodiment of the invention, the storage cell comprises a plurality of rechargeable storage cell elements which are arranged in series for an additive total voltage at the storage cell output terminals equal to the voltages of each of the plurality of cell elements. The housing of the battery pack comprises a power input terminal in addition to the power output terminals of the battery pack. The power input terminal is directly coupled to the positive storage cell output terminal and adapted to be used in conjunction with a battery charger for recharging the plurality of storage cell elements.

According to yet another, alternate embodiment of the invention, the reference voltage of the control circuit with respect to which the power requirements of a utilization circuit coupled to the power output terminals of the battery pack are sensed is a selectively alterable reference voltage.

A particular advantage of the summarized features of the invention and of the summarized features of particular embodiments thereto is that excess power capacity of the storage cell available at the output terminals of the voltage cell at a voltage higher than the rated voltage of the battery pack is available at the power output terminals of the battery pack but only at a predetermined or rated voltage of the battery pack. As a result, a dissipative voltage control circuit which may be part of a utilization device does not dissipate such excess energy. The excess energy, consequently, remains available for future use, and energy of the battery pack is only drained for operational use of the utilization device.

Another advantage and feature of the invention is the controllability of the reference voltage at the power pack. Such feature allows the voltage at the power terminals of the battery pack to be selectively adjusted to the precise voltage requirements of a utilization circuit. This latter feature increases the scope of applicability of the battery pack containing the features of the invention.

Other features and advantages of the invention are described with respect to the description of a preferred embodiment of the invention.

BRIEF DESCRIPTION OF THE DRAWINGS

The following detailed description of a preferred embodiment and of a preferred mode of practicing the invention will be best understood when read in reference to the accompanying drawings wherein.

DETAILED DESCRIPTION OF THE INVENTION

Figure 1:
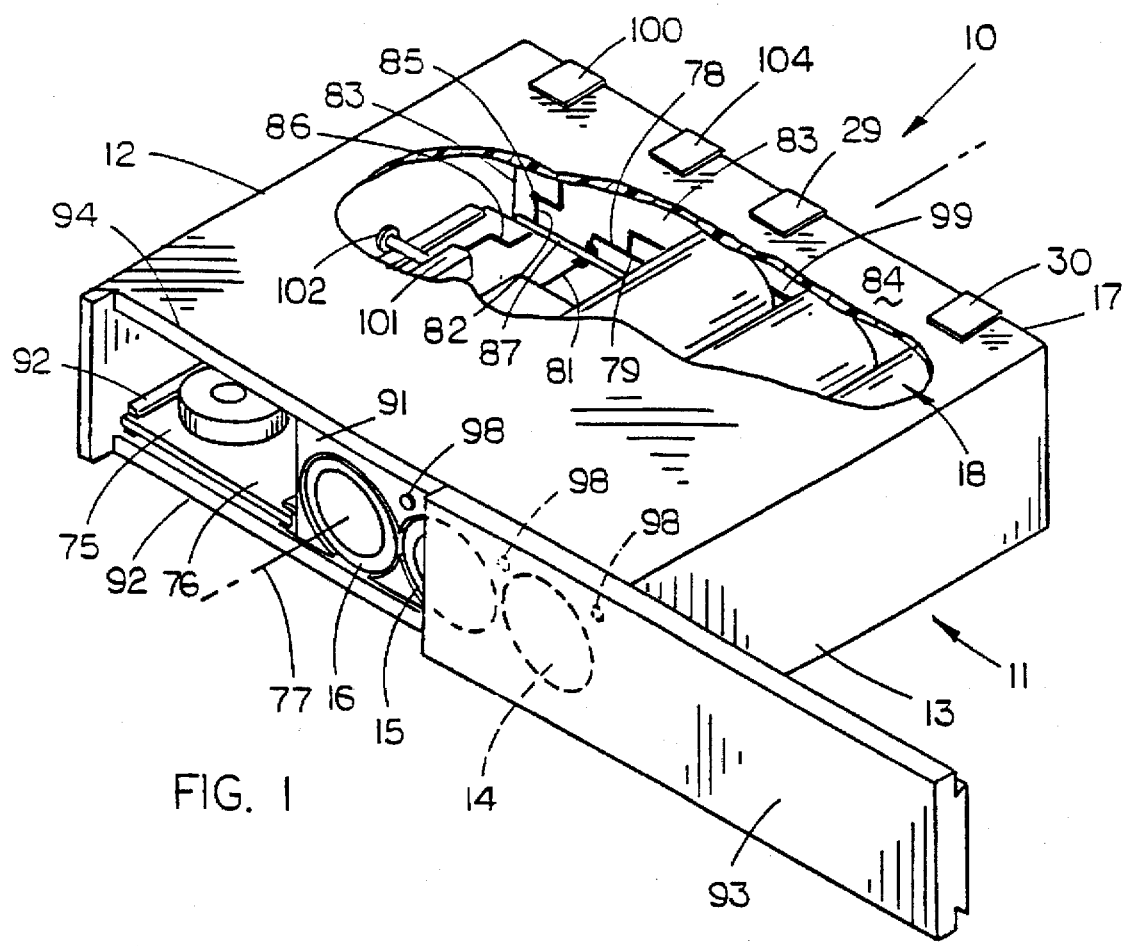
FIG. 1 is a somewhat schematic, pictorial representation of a battery pack which represents a currently preferred embodiment of the present invention.

Referring to FIG. 1, a battery pack, designated generally by the numeral 10, is illustrated and further described herein as a particular and preferred embodiment of the invention. By way of example, the battery pack 10 has a width measured in the direction perpendicular to the longitudinal extent of typical power cells. As shown in FIG. 1, the battery pack 10 substantially occupies the space of five typical AA-size power cells. In such embodiment, the outline of the battery pack 10 is established by a housing 11, preferably a molding of a typical thermoplastic material, with its width between two opposite side walls 12 and 13. Three power cells 14, 15 and 16 of a lithium-type are inserted adjacent one another on one side into the housing 11 toward a base end 17. Inasmuch as the invention relates to an efficient use of available battery power in view of typically variable voltage discharge characteristics of batteries, the discharge characteristics of lithium-type batteries serve as an example of various battery types which are advantageously used in conjunction with the features of the invention.

Electrically, the power cells are coupled in series, such that each power cell serves as one element of a three elements power cell, as identified by the numeral 18. Such a series coupling is well known in the art and involves coupling a negative terminal of a first element to a positive terminal of a second element. The non-coupled positive and negative terminals become the most positive and most negative terminals, with the resulting voltage of the series-coupled cell elements having a voltage value of a magnitude equal to the combined voltage of both elements. If a further element is coupled to the original two elements in the same manner, the combined voltage between the outermost terminals of the cells is equal to the combined voltage of the coupled cells. In such a three element configuration, each element having an expected typical minimum operating voltage of 2.4 volts and a fully charged potential of 3.4 volts, the added voltages contribute to an expected operating voltage in a range between 10.2 and 7.2 volts at output terminals 19 and 20 of the power cell 18. If the voltage requirements for a potential utilization device 21 (see FIG. 2) lie, for example, at a value of 5.0 volts, an excess voltage at the output terminals 19 and 20 ranges between 5.2 and 2.2 volts. In reference to the voltages of potentials, the voltage measured at the positive terminal 19 of the power cell 18 is measured to the negative terminal 20 which may also be referred to as ground or reference terminal. Thus, voltages referred to as existing at terminals, are considered to exist for purposes of discussion at such terminals when measured with respect to the negative terminal or ground terminal thereof.

Figure 2:
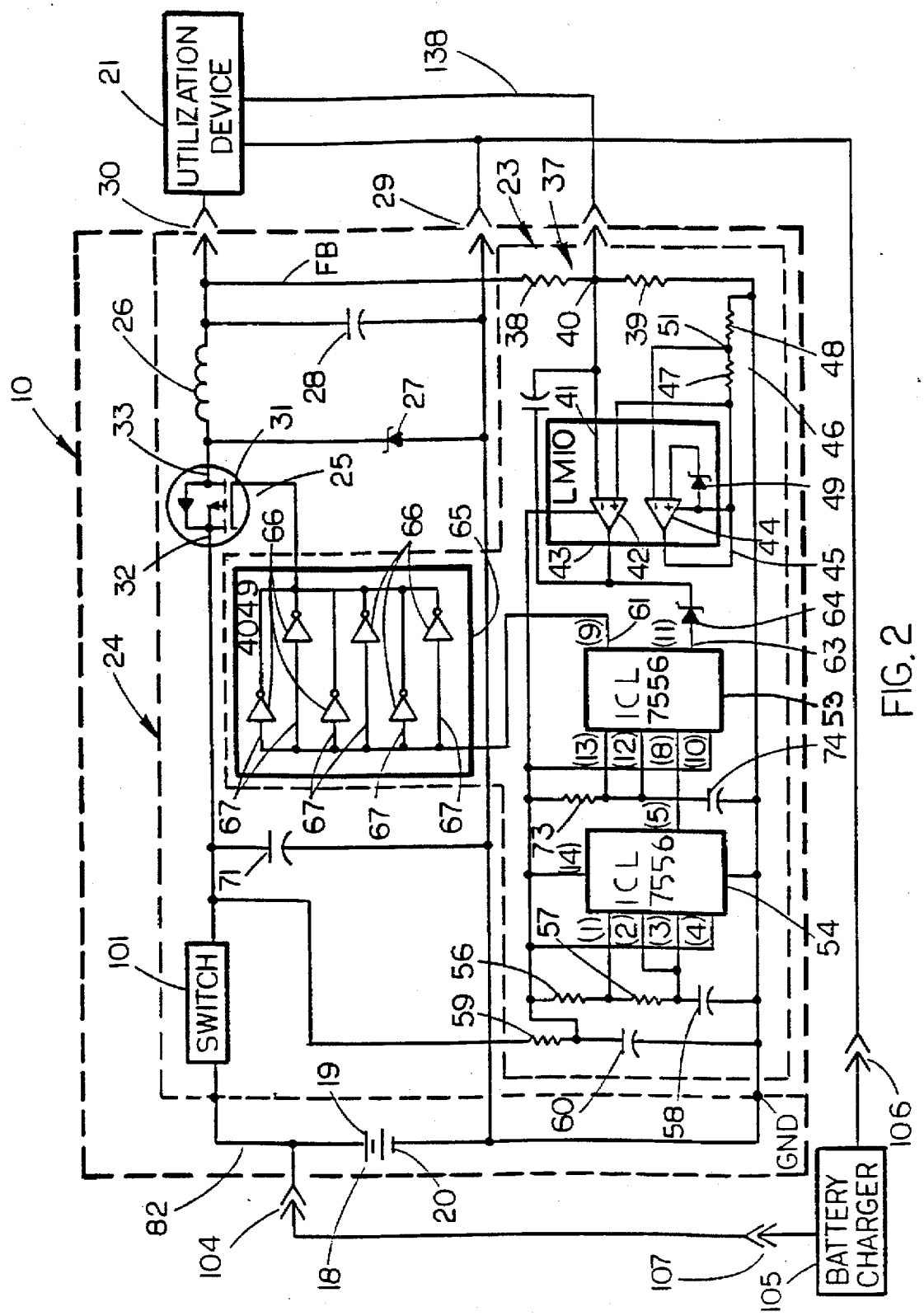
FIG. 2 is an electrical schematic diagram of the battery pack as shown in FIG. 1, and that of a typical utilization device, the schematic diagram showing the self-contained features of the battery pack.

The circuits (23, 24) of an exemplary embodiment of the present invention are illustrated in FIG. 2. A converter type voltage regulator 24 is electrically connected to an electronic control circuit 23 having a pulse generator circuit portion (54 generally) interconnected to a pulse width modulation circuit (53 generally) via an RC network (73, 74). The pulse width modulation circuit 53 is electrically connected at control terminal 63 to an error voltage amplifier 42 and at pin (9) to buffer amplifier 65. In operation the amplifier 44 compares the output voltages from the feedback loop 45 through the divider 48 such that the voltage at pin 40 is 3.0 V when the voltage at pin 30 is 5.0 V. The programming signal between the utilization device 21 and circuit 23 (at pin 40) is made via line 138. If line 138 were shorted in the utilization device 21 to pin 30 the circuit output would be equal to 3.0 V at pin 30. If the utilization device 21 was 3.3 V, for example, a resistor could be placed parallel to pin 40 which would produce a 3.3 V circuit output.

In a further description of the voltage regulator 24 and its control circuit, the identification of specific values of referred to components and elements are those of a specific example as a best mode known for practicing the invention. It should be understood by those skilled in the art that these specifications of values and components are for purposes of illustration only. Various changes and modifications are possible in implementing similar functional results without departing from the spirit and scope of the invention. Major operational elements of the regulator 24 are a switch 25 which is controlled by the circuit 23, an inductor 26 (25 microHenry) the current through which is regulated by an "on" and "off" operation of the switch, a bypass Schottky type diode 27 which accommodates a current flow through the inductor 26 when the switch is rendered non-conductive, and a capacitor 28 (47 microFarad, 16 volt) for filtering the voltage output of the regulator 24.

The control circuit 23 senses power requirements at output terminals 29 and 30 of the battery pack 10 and controls the voltage at a precise voltage, such as a nominal 5 volts, in accordance with expected voltage requirements by the utilization device 21. The utilization device may be any of various types of portable electronic devices which are typically powered by batteries or a battery pack. For purposes of explanation, the control circuit 23 is shown as a combination of a number of components and integrated circuits. A custom integrated circuit device including and performing the functions of the circuit elements contained by the circuit 23 may be used to more appropriately fit the control circuit 23 within space constraints imposed for many portable applications.

The switch 25, in the preferred example, is a P-channel enhancement mode type MOS Field Effect Transistor which becomes conductive, hence is turned "on", when the voltage at its gate 31 becomes negative with respect to the voltage at its source 32. Drain 33 of the switch 25 is coupled to the inductor 26 which is coupled to the positive power output terminal 30 of the battery pack 10. A feedback connection FB of the control circuit 23 is coupled to the output terminal 30 and monitors the voltage at the terminal 30. When the switch 25 is turned on, current through the inductor 26 ramps up linearly according to the relationship $$I_L = V/L^* t.$$

The output voltage at the output terminal 10 correspondingly increases as the current is delivered through the inductor 26. However, ramping of the voltage at the output terminal is limited by the control circuit 23 as described below. By its switching function, the switch 25 consequently selectively applies power available at the terminals 19 and 20 of the power cell 18 to external contacts of the terminals 29 and 30.

Referring to the diagram of the control circuit 23 in FIG. 2, the voltage at the output terminal 30 is referenced through a voltage divider 37 to ground. Resistors 38 and 39 of the voltage divider 37 are precision resistors of 10 K ohm and 15 K ohm, respectively. Thus, at a nominally desired voltage of five volts at the output terminal 30, a nominal voltage of three volts exists at a reference node 40 of the voltage divider 37. The node 40 is coupled to a negative driving input 41 of an error voltage amplifier 42 of an integrated circuit 43 (shown as a specific example as a circuit designed "LM10"). The circuit 43 further has the means for producing a voltage reference and an amplifier 44 for generating a stable reference voltage of three volts.

The amplifier 44 compares output voltage from a feedback loop 45 through a voltage divider 46 comprised of precision resistors 47 and 48 to a predetermined voltage of a voltage reference source 49, shown for purposes of illustration as a Zener diode. The voltage reference 49 characteristically provides a reference of 0.2 volts. A voltage at a reference node 51 of the resistors 47 and 48 is compared to the reference voltage established by the reference source 49 to drive the output of the amplifier 44. The values of the resistors 47 and 48 are 66.5 K ohms and 4.75 ohms, respectively. The resulting voltage division at the node 51 and its reference to the voltage of the voltage reference source 49 forces the output of the amplifier 44 to a precise three volt reference.

The output signal generated by the amplifier 42 of the integrated circuit 43, filtered by a capacitor 52, functions as a modulation signal of a pulse width modulation circuit 53. As shown in FIG. 2, the pulse width modulation circuit 53 and a pulse generator circuit 54 may be first and second halves of a typical 7556 type integrated timing circuit. Specifications of such commercially available circuits are readily available to connect the circuits in the manner shown in the drawing. However, for purposes of illustration, numbers shown in parentheses above certain leads coupled to the respective circuits 53 and 54 indicate terminal pin numbers of a typical 6556 type integrated timing circuit. The pulse generator circuit or oscillator 54 is configured by resistors 56 and 57 (57.6 K ohm and 7.50 K ohm, respectively) and a capacitor 58 (47 picoFarad) to operate at a frequency of nominally 200 Khz with a narrow and non-modulated pulse width. Power is supplied to the 7556 type integrated circuit 53, 54 and the integrated circuit 43 through a filter circuit which in the preferred embodiment is the combination of a resistor 59 and a capacitor 60. The resistor 59 in the preferred embodiment has a value of 470 ohm and the corresponding capacitor 60 has a 3.3 microFarad, 16 volt designation. The resulting combination functions to reduce transients that may be introduced by the switch 25.

The pulses generated by the first half 54 of the 7556 type integrated timing circuit are then applied to the second half 53 of the circuit to trigger a control pulse train at an output terminal 61 of the pulse width modulator circuit 53. The pulse width of the control pulses at the output terminal 61 becomes modulated in response to high or low control voltages applied at a control terminal 63 of the pulse width modulator circuit 53. The output signal of the amplifier 42 is coupled through a Schottky diode 64 to the control terminal 63, such that when the output from the amplifier 42 drives the voltage at the terminal 63 low, the pulse width of the pulsed output at the terminal 61 decreases.

The train of pulses at the terminal 61 is applied directly to a buffer amplifier 65 which in the preferred embodiment comprises a plurality of inverting buffers 66. The buffers 66 are arranged in parallel to provide a sufficient current source for driving the inherently high capacitive gate load of the switch 25. During the time of a pulse applied to the input leads 67 of the buffers 66, an output signal from the buffers 66 remains low, which activates or closes the switch 25, establishing a low impedance path between the positive output terminal 19 of the power cell 18 shown schematically by a battery 18, and the inductor 26. A capacitor 71 (47 microFarad, 25 volt) is coupled in parallel across the battery output terminals 19 and 20, thereby effectively lowering the impedance of the battery 18 by permitting a charge stored in the capacitor to respond to pulsing current demands of the switch 25.

When the signal at the gate 31 of the switch 25 switches to a high state, the switch 25 goes to a high impedance or non-conductive state. At this time, however, there is a certain amount of energy stored in the inductor 26. The stored energy in the inductor 26 is delivered to the output terminal 30 by a decaying current flow through the Schottky diode 27 which is coupled between the inductor 26 and ground. The current flow through the inductor 26 continues to decrease until the pulse generator and the pulse width modulator circuits 54 and 53 apply the next pulse through the buffer 66 to the switch 25. At that time, the current through the inductor 26 is again ramped up for a time determined by the pulse width of such next pulse. However, as described, the pulse width is controlled by the voltage appearing at the output terminal 30. An RC network comprising a resistor 73 and a capacitor 74 provide the nominal pulse width of the pulse train from which the width modulation occurs. The values chosen for the resistor 73 and the capacitor 74 were 32.4 K ohm and 100 pF, respectively. These values are intended to yield an initial, approximately equally divided on-off cycle. However, the precise values of the resistor 73 and the capacitor 74 are not critical, in that modulation of the pulse width alters the pulse width to maintain the desired voltage at the terminals and enable the regulator 24 to satisfy the current requirements of the utilization device 21. The voltage regulator 24 consequently regulates or converts the voltage from values varying over a range characteristic to the discharge cycle of the particular type power cell 18 to values within a second range which is predetermined and defined by relatively much smaller variations which can be preestablished by the reference elements of the control circuit 23, as set forth in the described preferred embodiment, for example.

The control circuit 23 and its function of controlling the switch 25 and the operation of the inductor 26 is set forth as a preferred manner for practicing the current invention. The switched converter-type voltage regulator 24 described in reference to FIG. 2 is preferred because of its known efficiency as compared to dissipative type regulator circuits. It should, however, be understood that the present invention may be practiced with another type of voltage regulator, either of the switched converter variety as described or a modification thereof, or with a dissipative regulator circuit, recognizing, however, that in the latter instance the benefit of the efficiency of a switched converter is not available.

Referring back to FIG. 1, the described voltage regulator circuit 24 including the control circuit 23 physically is a circuit module 75 which resides on and is supported by a circuit board 76, the board 76 forming part of the module 75. The module 75 is disposed within the housing 11, preferably adjacent the three power cells 14, 15, and 16. The housing 11 may preferably include the power output terminals 29 and 30 as integrally molded elements, external, respectively positive and negative contacts of which, also correspondingly identified by numerals 29 and 30, extending partially or completely across the base end 17. Of course, integrally molding the power output terminals and respective external contacts into the housing 11 is but one of a number of ways in which the output terminals 29 and 30 may be attached or mounted to the housing 11. Another manner of mounting the terminals 29 and 30 is by riveting the external contacts to the base end 17, the rivets then forming part of the respective terminals 29 and 30, and extending through the base end 17 to the inside so as to enable the external contacts to be electrically coupled to the internal electrical components as described herein.

To minimize the risk of inverting or reversing the battery pack 10 when coupling the pack 10 to a utilization device, such as by inserting the pack 10 into a battery cavity, the negative or ground terminal 29 and its respective external contact is preferably located centered on a longitudinal plane along an axis of symmetry 77 through the battery pack 10 and through the most negatively coupled power cell 16 of the three power cells of the battery pack 10. Thus even during an accidental reversal of the battery pack 10 about the axis 77 during the insertion of the pack into a battery cavity, the negative or ground terminal 29 and its respective external contact of the battery pack 10 will nevertheless be coupled to the correctly corresponding ground terminal of a utilization device 21.

Terminal extensions 78 and 79 are shown on the internal side of the housing 11 adjacent and extending along the base end 17. The extensions 78 and 79 couple the ground terminal 29 electrically respectively to a ground ("GND") terminal 81 on the circuit board module 75 and to the negative output terminal 20 of the battery 18, shown best in the diagram of FIG. 2. The positive output terminal 19 of the battery 18, still in reference to FIG. 2, is contacted to a terminal and conductive extension 82, which in turn is adapted to establish connection with the circuit board module 75 when the module 75 is disposed within the housing 11 as shown in FIG. 1. The break-away section of FIG. 1 shows electrical connections, such as extensions 78, 79 and 82 conveniently routed along a header 83, which in the preferred embodiment extends substantially over the entire length of the base end 17 of the housing. The header 83 may be molded as an integral part of the housing 11 to contain interconnecting conductors such as the extensions 78 and 79, for example. More desirably, however, the header 83 is a double-sided circuit board, which is mounted into the base end 17 adjacent a terminal end 84 of the housing 11. When the header 83 is mounted as shown in FIG. 1, contact is made between inner ends of the power terminals 29 and 30 and adjacent contact pads coupling the respective conductive extensions via through holes 85 in the header to, for example a power output terminal 86 or the ground terminal 81 of the circuit board module 75. The electrical connection between the circuit board module 75 and the header 83 may be established in known manner for joining terminals on adjacent circuit boards, such as by a resilient connector 87.

Figure 3:
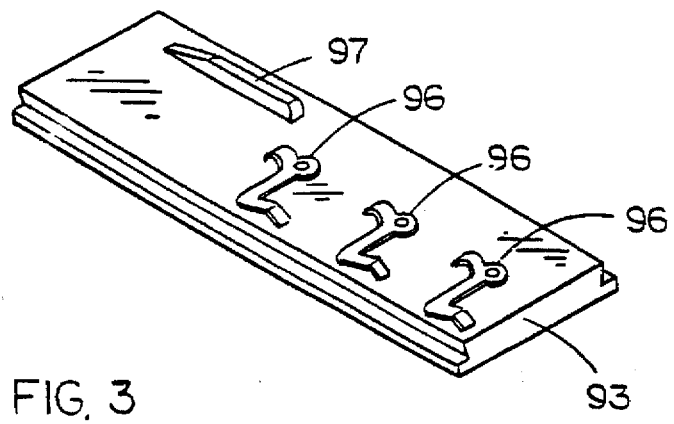
FIG. 3 is a perspective view of the inside of the housing cap.

By way of example, the power cell elements 14, 15 and 16 and the circuit board module 75 are slidably insertible into the housing 11, such as along longitudinal guide surfaces 91 for positioning the elements and guide rails 92 for receiving the circuit board module 75. The inserted components are retained in place by a housing cap 93 which may be arranged for slidable closure of the housing 11, or by being placed over an open insertion end 94 of the housing 11 by other known means such as molded snaps, for example. The cap 93, FIG. 3, preferably contains necessary electrical contacts 96 and such features as camming surfaces 97 for interconnecting the power cell elements 14, 15 and 16 as described herein and for urging the circuit board module 75 into position against the resilient connector. When the cap 93 is placed in position to close off the open insertion end 94 of the housing 11, the electrical contacts 96 become disposed on the inside of the housing 11, bearing in part against adjacent ends of the power cell elements 14, 15 and 16.

While there are a number of ways for positioning the power cell elements in a convenient manner, by way of example, all three elements may be inserted with their respective positive terminals against contacts on an adjacent surface of the header 83. In such an arrangement, the electrical contacts 96 (see also FIG. 3) may couple the negative terminals to feed-through conductors 98. The conductors 98 establish electrical connection with the header 83, such that conductors 99 of the header 83 electrically couple the cell elements 14, 15 and 16 in series as well as couple their series output through the respective terminals 81 and 82 to the circuit board module 75. Other means of coupling the power cell elements in series may be devised. For example, the power cell elements may be assembled by means of a subassembly, not shown, which encases series connections in a typical shrink wrap for the battery cell elements 14, 15 and 16. Such a subassembly might then be inserted as a unit into the housing 11. It is to be understood that in the event the use of such a subassembly is contemplated, certain features of the described housing 11, such as the guide surfaces 91 may need to be appropriately modified to accommodate any such contemplated subassembly of the battery 18.

The described battery pack 10 advantageously controls the voltage output between the power output terminals 29 and 30. Any utilization device the electrical inputs of which may become coupled to the terminals can avail itself of the described, quite constant voltage output over the discharge cycle of the battery pack 10. Furthermore, since excess voltages existing over the discharge life of the power cell elements 14, 15 and 16 are regulated by the converter regulator 24 of the battery pack 10 directly, electrical discharge cycles become controlled independently of voltage regulators which may be part of the utilization device which may make use of the battery pack 10. The discharge life of the battery pack 10 thereby tends to become more a function of the actual power usage of the utilization device rather than of unnecessary power dissipation which may be caused by inefficient power regulators associated with a particular utilization device.

FIG. 1 further shows a terminal and external contact 100 in the housing 11 preferably spaced from the negative external contact and terminal 29 symmetrically opposite to the terminal 30. The terminal 100 may be connected as a second positive power output terminal in a manner substantially identical to that of the terminal 30, also having respective internal terminal portions and external contacts. In addition to the availability of two positive power output terminals if so desired, the battery pack 10 also becomes symmetrical about the axis of symmetry 77, such that the battery pack 10 can be inverted about such axis and inserted into a utilization device without malfunctioning.

In reference to FIG. 1 and the schematic diagram of FIG. 2, it should be pointed out that a switch 101 may be desirable to disable the converter circuit during prolonged periods of non-use of the utilization device with which the battery pack 10 is associated, or to extend the shelf life of the battery pack 10 once the power cell elements 14, 15, and 16 have been inserted into the housing 11. A primary mechanical switch will serve the function of the switch 101 for extending the shelf life of a fully assembled battery pack 10. Such a mechanical switch may, for example, include a mechanical button contact 102 which protrudes through the housing 11. When the battery pack 10 is inserted into a battery cavity (not shown) of a utilization device, the button contact becomes depressed toward the housing 11 and the switch 101 is closed.

A charging terminal 104 is shown in FIG. 1 intermediate of the positive terminal 100 and the negative terminal 29. The charging terminal is a power input terminal with similar external contact as the terminals 29 and 30. The charging terminal 104 allows a battery charger 105 to become connected between the negative power terminal 29 and the charging terminal 104. Typically it is necessary to protect the circuitry of the utilization device from higher potentials applied during charging cycles. The converter regulator 24 provides such a protection even during a charging cycle, such that the battery charger 105, as shown in FIG. 2 as an independent power source, may remain coupled to the utilization device and charge the battery while at the same time providing power to the utilization device, as controlled by the converter regulator 24. The current source for charging the battery 18 may typically result in a voltage with respect to ground appearing at the positive output terminal 19 of the battery 18, which voltage may likely exceed maximum voltage specifications for the utilization device 24. However, the regulator 24 being interposed between the terminal 19 and the output terminal 30 and its external contact, converts the charging voltage to the desired voltage as measured with respect to the ground or negative terminal 29. FIG. 2 further shows the manner in which the battery charger 105 is coupled through terminals 106 and 107 to such utilization device and, in turn, to the battery pack 10.

It is to be realized that the housing according to the preferred embodiment accommodates standard power cell elements, such as AA type batteries. Such elements may be of a single use type, hence not of the type which may be recharged without danger of explosion, or they may be of the described lithium type rechargeable elements, in which event a charger may be used without danger. In the event that non-rechargeable batteries are used in conjunction with the housing 11, the housing may be inverted about its axis of symmetry. While the battery pack 10 will still function as described, the inversion prevents the charging contact from becoming coupled to the external battery charger 105 and the power cell elements remain protected.

While the foregoing invention has been described in terms of a specific, preferred embodiment thereof it is to be understood that various changes and modifications can be made in any of a number of ways in the described embodiment without departing from the spirit and scope of the invention. This invention is to be defined and limited only by the scope of the claims appended hereto.

I claim:

1. A battery pack comprising:

power cell having positive and negative terminals, the positive terminal having a positive voltage with respect to the voltage at the negative terminal, such positive voltage having values subject to measurable variations over a first range during a discharge cycle of the power cell;

housing means encasing the power cell, said housing means including external positive and negative contacts; and regulating means, coupled respectively between the positive terminal of the power cell and the positive contact of the housing means, and between the negative terminal of the power cell and the negative contact of the housing means, for regulating the voltage at the positive terminal with respect to the voltage at the negative terminal of the power cell to values within a predetermined second range, and for applying such regulated values to the positive contact with respect to the negative contact of the housing means, whereby the power cell has between such positive and negative contacts a characteristic voltage variation of the predetermined range of values over the discharge cycle of the power cell; wherein the regulating means is a switching type voltage converter and includes switch means operable to regulate the voltage at the positive contact of the housing means with respect to the negative contact, the switch means being connected between the positive contact and the positive terminal of the power cell, and in that the regulating means includes sensing means operable throughout the discharge cycle to sense the voltage requirements of a utilization device, connected between the positive and negative contacts of the housing means, and to control the regulating means to provide the appropriate voltage required by the utilization device.

2. A battery pack according to claim 1, wherein the power cell comprises of at least two power cell elements each of the power cell elements having positive and negative terminals.

3. A battery pack according to claim 2, wherein said housing means comprises a molded housing, including guide surfaces for inserting the power cell elements into said housing, and a cap for retaining the power cell elements within said housing, the cap including means for electrically coupling terminals to said voltage converter.

4. A battery pack according to claim 1 wherein the regulating means is a switching type voltage converter and the regulated voltage values are converted voltage values.

5. A battery pack according to claim 2 wherein the regulating means is a switching type voltage converter and the regulated voltage values are converted voltage values.

6. A battery pack according to claim 3 wherein the regulating means is a switching type voltage converter and the regulated voltage values are converted voltage values.

7. A battery pack according to claim 1, wherein the voltage converter comprises means, controlled by the output voltage appearing between the positive and negative contact of the housing means, for selectively applying power available at the respective terminals of the power cells to the contacts of the housing means, said selective power application means including a first capacitor coupled across the positive and negative contacts of the housing means, and a second capacitor coupled across the positive and negative terminals of the power cell.

8. A battery pack according to claim 2, wherein the voltage converter comprises means, controlled by the output voltage appearing between the positive and negative contact of the housing means, for selectively applying power available at the respective terminals of the power cells to the contacts of the housing means, said selective power application means including a first capacitor coupled across the positive and negative contacts of the housing means, and a second capacitor coupled across the positive and negative terminals of the power cell.

9. A battery pack according to claim 3, wherein the voltage converter comprises means, controlled by the output voltage appearing between the positive and negative contact of the housing means, for selectively applying power available at the respective terminals of the power cells to the contacts of the housing means, said selective power application means including a first capacitor coupled across the positive and negative contacts of the housing means, and a second capacitor coupled across the positive and negative terminals of the power cell.

10. A battery pack according to claim 2, wherein the housing means comprises means for receiving the power cell elements, means for supporting the voltage converter, and further including a circuit header board mounted within the housing, the circuit header including terminals and conductive extensions for electrically coupling the power cell elements to the voltage converter and means for electrically coupling the converted voltage values to the external contacts of the housing means.

11. A battery pack according to claim 2, wherein the voltage converter is a voltage converter module comprising a circuit board, and wherein said selective power application means is mounted on said circuit board and coupled module further comprising means mounted on said circuit board and coupled to said selective power application means for controlling the operation of the selective power application means.

12. A battery pack according to claim 2, further comprising a switch for selectively isolating the positive terminal of the power cell from being coupled to the voltage converter.

13. A battery pack according to claim 2, further comprising means for coupling a battery charger across the positive and negative terminals of the power cell, whereby a voltage applied to the terminals of the power cell is applied to the voltage converter for conversion to values within said predetermined second range for application to said external contacts of the housing.

14. A battery pack according to claim 2, wherein the housing means comprises a molded housing, said housing supporting the external negative contact disposed at a base of the housing and centered on a central axis through the housing and the external positive contact disposed in spaced relationship along said base adjacent a side wall of the housing, the housing further comprising guide means for receiving the voltage converter and the power cell elements, the housing means further comprising header means for electrically coupling the power cell elements to the voltage converter and means for electrically coupling the converted voltage values to the external contacts of the housing means.

15. A battery pack according to claim 14, wherein the positive external contact is a first positive external contact, the housing further supporting a second positive external contact spaced from the centered negative contact in symmetry to said first positive external contact.

16. A battery pack according to claim 2, wherein the regulating means comprises means for converting the positive voltage at the positive terminal with respect to the negative terminal of the power cell to a predetermined constant value over the discharge cycle of the power cell and for applying the converted voltage between the positive and negative external contacts.

17. A battery pack according to any of claims 2, which further comprises a power input terminal disposed in the housing and extending through the housing, an external portion of the power input terminal being adapted to be coupled to a positive power terminal of a battery charging device, the negative external contact being adapted to be coupled to the negative power terminal of the battery charging device, whereby a positive input voltage at a voltage, level in excess of the voltage level of the power cell applied to the positive terminal with respect to the negative terminal of the power cell for charging the power cell is converted by the voltage converting means prior to the voltage converting means applying the voltage to the positive external contact of the battery pack.

18. A battery pack according to claim 17, wherein the housing has a predetermined width between two opposite side walls, a base extending between the two side walls, the external contact and the power input terminal being spacedly disposed along the base, wherein a first one of the external contacts is centered along the base between the two opposite side walls and a second one of the external contact is spacedly located at a first, predetermined distance from the first external contact adjacent one of the side walls, and the power input terminal is spacedly located at a second predetermined distance from the centered first terminal.

19. A battery pack according to claim 18, wherein the first one of the external contacts is the negative contact, the positive power terminal is a first positive power terminal and the external portion thereof is a first positive contact, the housing including a second positive power terminal extending through the housing, a portion of the second positive power terminal being disposed externally of the housing and forming a second positive contact, the second positive contact being spacedly located at the first predetermined distance from the negative external contact adjacent the other side wall of the housing, the second predetermined distance being less than the first predetermined distance such that the power input terminal is located between the negative and one of the positive contacts of the battery pack, the means for converting the voltage and for applying the converted voltage including means for applying the converted voltage to the second positive external contact of the battery pack.

20. A battery pack according to claim 2, wherein the power cell is a plurality of power cell elements, the housing including means for slidably receiving the power cell elements, and wherein the means for converting the voltage at the positive terminals of the power cell and for applying the converted voltage to the positive external contact includes a voltage converter module, the voltage converter module having negative and positive input terminals and negative and positive output terminals, and means disposed within the housing adjacent a base of the housing for electrically coupling the power cell elements in series, thereby forming the power cell with the combined voltage of each of the power cell elements, means for coupling the negative and the positive terminals of the power cell to the respective input terminals of the voltage converter module, and means for coupling the output terminals of the voltage converter module to the respective external contact of the battery pack.

21. A battery pack according to claim 18, wherein the housing further includes means for slidably receiving the voltage converter module, the means for coupling including a resilient connector disposed adjacent an inner end of the means for slidably receiving the voltage converter module for coupling the inserted voltage converter module to the means for coupling, and wherein the battery pack further includes a cap adapted to retain the power cell elements and the voltage converter module within the housing, the cap including portions of the means for coupling the power cell elements in series.

22. A battery pack according to claim 2, wherein:
the regulating means comprises a voltage converter module having negative and positive input and output terminals; wherein
said housing has spaced side walls, a base, an open end opposite the base, and means for receiving and for retaining the plurality of power cell elements and the voltage converter module within the housing; and further comprises
means for coupling the plurality of power cell elements in series, thereby providing, a power cell having the combined voltage of the elements and negative and positive output terminals, means for coupling the negative and positive output terminals of the power cell to respective negative and positive input terminals of the voltage converter module, and means for coupling, the negative and positive output terminals of the voltage converter module to the respective negative and positive power contacts of the housing.

23. A battery utilization device battery regulation apparatus for operable connection between a battery and a battery utilization device, comprising a switching type voltage converter having
(1) a switch operable to regulate the voltage output of a battery wherein said switch regulates battery voltage output,
(2) a sensor for sensing the voltage requirements of a battery utilization device and for controlling said switch such that a battery utilization device connected to said apparatus while said apparatus is connected to a battery will receive the sensed required voltage over a portion of the discharge cycle of said battery.

24. The battery utilization device battery regulation apparatus of claim 23, wherein said portion of the discharge cycle includes both utilization periods wherein the battery output is both greater than and lesser than the voltage requirement of the battery utilization device.

25. The battery utilization device battery regulation apparatus of claim 24, wherein the output voltage of said apparatus is zero when the battery utilization device's voltage requirement is zero.

26. The battery utilization device battery regulation apparatus of claim 23, wherein the voltage converter comprises a selector, controlled by the output voltage of the battery, for selectively applying power.

27. The battery utilization device battery regulation apparatus of claim 23, wherein said selector includes a capacitor.

28. A battery pack comprising:
power cell having positive and negative terminals, the positive terminal having a positive voltage with respect to the voltage at the negative terminal, such positive voltage having values subject to measurable variations over a first range during a discharge cycle of the power cell;
housing means encasing the power cell, said housing means including external positive and negative contacts;
regulating means, coupled respectively between the positive terminal of the power cell and the positive contact of the housing means, and between the negative terminal of the power cell and the negative contact of the housing means, for regulating the voltage at the positive terminal with respect to the voltage at the negative terminal of the power cell to values within a predetermined second range, and for applying such regulated values to the positive contact with respect to the negative contact of the housing means, whereby the power cell as between such positive and negative contacts a characteristic voltage variation of the predetermined second range of values over the discharge cycle of the power cell characterized in that:

the regulating means is a switching type voltage converter and includes switch means operable to regulate the voltage at the positive contact of the housing means with respect to the negative contact, the switch means being connected between the positive contact and the positive terminal of the power cell, and in that the regulating means includes sensing means operable throughout the discharge cycle to sense the voltage requirements of a utilization device, connected between the positive and negative contacts of the housing means, and to control the regulating means to provide the appropriate voltage regulation required by the utilization device.

29. A battery pack according to claim 28, wherein the power cell comprises at least two power cell elements each of the power cell elements having positive and negative terminals.

30. A battery pack according to claim 29, wherein said housing means comprises a molded housing including guide surfaces for inserting the power cell elements into said housing, and a cap for retaining the power cell elements within said housing, the cap including means for electrically coupling terminals to said voltage converter.

31. A battery pack according to claim 28, wherein the voltage converter comprises means, controlled by the output voltage appearing between the positive and negative contacts of the housing means, for selectively applying power available at the respective terminals of the power cells to the contacts of the housing means, said selective power application means including a first capacitor coupled across the positive and negative contacts of the housing means, and a second capacitor coupled across the positive and negative terminals of the power cell.

32. A battery pack according to claim 28, wherein the housing means comprises means for receiving the power cell elements, means for supporting the voltage converter, and further including a circuit header board mounted within the housing, the circuit header board including terminals and conductive extensions for electrically coupling the power cell elements to the voltage converter and means for electrically coupling the converted voltage values to the external contacts of the housing means.

33. A battery pack according to claim 28, wherein the voltage converter is a voltage converter module comprising a circuit board, and wherein said selective power application means is mounted on said circuit board, the voltage converter module further comprising means mounted on said circuit board and coupled to said selective power application means for controlling the operation of the selective power application means.

34. A battery pack according to claim 28, further comprising a switch for selectively isolating the positive terminal of the power cell from being coupled to the voltage converter.

35. A battery pack according to claim 28, further comprising means for coupling a battery charger across the positive and negative terminals of the power cell, whereby a voltage applied to the terminals of the power cell is applied to the voltage converter for conversion to values within said predetermined second range for application to said external contact of the housing means.

36. A battery pack according to claim 28, wherein the housing means comprises a molded housing, said housing supporting the external negative contact disposed at a base of the housing and centered on a central axis through the housing and the external positive contact disposed in spaced relationship along said base adjacent a side wall of the housing, the housing further comprising guide means for receiving the voltage converter and the power cell elements, the housing means further comprising header means for electrically coupling the power cell elements to the voltage converter and means for electrically coupling the converted voltage values to the external contacts of the housing means.

37. A battery pack according to claim 35, wherein the positive external contact is a first positive external contact, the housing further supporting a second positive external contact spaced from the centered negative contact in symmetry to said first positive external contact.

38. A battery pack according to claim 28, wherein:
the regulating means comprising means for convening the positive voltage at the positive terminal with respect to the negative terminal of the power cell to a predetermined constant value over the discharge cycle of the power cell and for applying the converted voltage between the positive and negative external contacts.

39. A battery pack according to any of claims 28, which further comprises:

a power input terminal disposed in the housing and extending through the housing, an external portion of the power input terminal being adapted to be coupled to a positive power terminal of a battery charging device, the negative external contact being adapted to be coupled to the negative power terminal of the battery charging device, whereby a positive input voltage at a voltage level in excess of the voltage level of the power cell applied to the positive terminal with respect to the negative terminal of the power cell for charging the power cell is converted by the voltage converting means prior to the voltage converting means applying the voltage to the positive external contact of the battery pack.

40. A battery pack according to claim 39, wherein the housing has a predetermined width between two opposite side walls, a base extending between the two side walls, the external contacts and the power input terminal being spacedly disposed along the base, wherein a first one of the external contacts is centered along the base between the two opposite side walls and a second one of the external contacts is spacedly located at a first, predetermined distance from the first external contact adjacent one of the side walls, and the power input terminal is spacedly located at a second predetermined distance from the centered first terminal.

41. A battery pack according to claim 40, wherein the first one of the external contacts is the negative contact, the positive power terminal is a first positive power terminal and the external portion thereof is a first positive contact, the housing including a second positive power terminal extending through the housing, a portion of the second positive power terminal being disposed externally of the housing and forming a second positive contact, the second positive contact being spacedly located at the first predetermined distance from the negative external contact adjacent the other side wall of the housing, the second predetermined distance being less than the first predetermined distance such that the power input terminal is located between the negative and one of the positive contacts of the battery pack, the means for converting the voltage and for applying the converted voltage including means for applying the converted voltage to the second positive external contact of the battery pack.

42. A battery pack according to claim 28, wherein the power cell is a plurality of power cell elements, the housing including means for slidably receiving the power cell elements, and wherein the means for converting the voltage at the positive terminals of the power cell and for applying the converted voltage to the positive external contact includes a voltage converter module, the voltage converter module having negative and positive input terminals and negative and positive output terminals, and means disposed within the housing adjacent a base of the housing for electrically coupling the power cell elements in series, thereby forming the power cell with the combined voltage of each of the power cell elements, means for coupling the negative and the positive terminals of the power cell to the respective input terminals of the voltage converter module, and means for coupling the output terminals of the voltage converter module to the respective external contacts of the battery pack.

43. A battery pack according to claim 41, wherein the housing further includes means for slidably receiving the voltage converter module, the means for coupling including a resilient connector disposed adjacent an inner end of the means for slidably receiving the voltage converter module for coupling the inserted voltage converter module to the means for coupling, and wherein the battery pack further includes a cap adapted to retain the power cell elements and the voltage converter module within the housing, the cap including portions of the means for coupling the power cell elements in series.

44. A battery pack according to claim 29, wherein:

the regulating means comprises a voltage converter module having negative and positive input and output terminals; wherein said housing has spaced side walls, a base, an open end opposite the base, and means for receiving and for retaining the plurality of power cell elements and the voltage converter module within the housing; and further comprises means for coupling the plurality of power cell elements in series, thereby providing a power cell having the combined voltage of the elements and negative and positive output terminals, means for coupling the negative and positive output terminals of the power cell to respective negative and positive input terminals of the voltage converter module, and means for coupling the negative and positive output terminals of the voltage converter module to the respective negative and positive power contacts of the housing.

45. A battery pack comprising:

power cell having positive and negative terminals, the positive terminal having a positive voltage with respect to the voltage at the negative terminal, such positive voltage having values subject to measurable variations over a first range during a discharge cycle of the power cell;

a housing encasing the power cell, said housing including external positive and negative contacts; and a regulator, coupled respectively between the positive terminal of the power cell and the positive contact of the housing, and between the negative terminal of the power cell and the negative contact of the housing, for regulating the voltage at the positive terminal with respect to the voltage at the negative terminal of the power cell to values within a predetermined second range, and for applying such regulated values to the positive contact with respect to the negative contact of the housing, whereby the power cell has between such positive and negative contacts a characteristic voltage variation of the predetermined range of values over the discharge cycle of the power cell; wherein the regulator is a switching type voltage converter and includes a switch operable to regulate the voltage at the positive contact of the housing with respect to the negative contact, the switch being connected between the positive contact and the positive terminal of the power cell, and in that the regulator includes a sensor operable throughout the discharge cycle to sense the voltage requirements of a utilization device, connected between the positive and negative contacts of the housing, and to control the regulator to provide the appropriate voltage required by the utilization device.

46. A battery pack according to claim 45, wherein the power cell comprises of at least two power cell elements each of the power cell elements having positive and negative terminals.

47. A battery pack according to claim 46, wherein said housing comprises a molded housing, including guide surfaces for inserting the power cell elements into said housing, and a cap for retaining the power cell elements within said housing, the cap including for electrically coupling terminals to said voltage converter.

48. A battery pack according to claim 45 wherein the regulator is a switching type voltage converter and the regulated voltage values are converted voltage values.

49. A battery pack according to claim 45, wherein the voltage converter comprises a regulator controlled by the output voltage appearing between the positive and negative contact of the housing, for selectively applying power available at the respective terminals of the power cells to the contacts of the housing, said selective power application including a first capacitor coupled across the positive and negative contacts of the housing, and a second capacitor coupled across the positive and negative terminals of the power cell.

50. A battery pack according to claim 47, wherein the voltage converter comprises a selector, controlled by the output voltage appearing between the positive and negative contact of the housing, for selectively applying power available at the respective terminals of the power cells to the contacts of the housing, said selective power application including a first capacitor coupled across the positive and negative contacts of the housing, and a second capacitor coupled across the positive and negative terminals of the power cell.

51. A battery pack according to claim 46, wherein the housing comprises a frame for receiving the power cell elements, for supporting the voltage converter, and further including a circuit header board mounted within the housing, the circuit header including terminals and conductive extensions for electrically coupling the power cell elements to the voltage converter and for electrically coupling the converted voltage values to the external contacts of the housing.

52. A battery pack according to claim 46, wherein the voltage converter is a voltage converter module comprising a circuit board, and wherein said power application selector is mounted on said circuit board and further comprising a frame mounted on said circuit board and coupled to said power application selector for controlling the operation of the selector.

53. A battery pack according to claim 46, further comprising a switch for selectively isolating the positive terminal of the power cell from being coupled to the voltage converter.

54. A battery pack according to claim 47, further comprising charging contacts for coupling a battery charger across the positive and negative terminals of the power cell, whereby a voltage applied to the terminals of the power cell is applied to the voltage converter for conversion to values within said predetermined second range for application to said external contacts of the housing.

55. A battery pack according to claim 46, wherein the housing comprises a molded housing, said housing supporting the external negative contact disposed at a base of the housing and centered on a central axis through the housing and the external positive contact disposed in spaced relationship along said base adjacent a side wall of the housing, the housing further comprising a guide for receiving the voltage converter and the power cell elements, the housing further comprising a header for electrically coupling the power cell elements to the voltage converter and for electrically coupling the converted voltage values to the external contacts of the housing.

56. A battery pack according to claim 55, wherein the positive external contact is a first positive external contact, the housing further supporting a second positive external contact spaced from the centered negative contact in symmetry to said first positive external contact.

57. A battery pack according to claim 46, wherein the regulator comprises a converter for converting the positive voltage at the positive terminal with respect to the negative terminal of the power cell to a predetermined constant value over the discharge cycle of the power cell and for applying the converted voltage between the positive and negative external contacts.

58. A battery pack according to any of claims 46, which further comprises a power input terminal disposed in the housing and extending through the housing, an external portion of the power input terminal being adapted to be coupled to a positive power terminal of a battery charging device, the negative external contact being adapted to be coupled to the negative power terminal of the battery charging device, whereby a positive input voltage at a voltage level in excess of the voltage level of the power cell applied to the positive terminal with respect to the negative terminal of the power cell for charging the power cell is converted by the voltage converting prior to the voltage converter applying the voltage to the positive external contact of the battery pack.

59. A battery pack according to claim 58, wherein the housing has a predetermined width between two opposite side walls, a base extending between the two side walls, the external contact and the power input terminal being spacedly disposed along the base, wherein a first one of the external contacts is centered along the base between the two opposite side walls and a second one of the external contact is spacedly located at a first, predetermined distance from the first external contact adjacent one of the side walls, and the power input terminal is spacedly located at a second predetermined distance from the centered first terminal.

60. A battery pack according to claim 59, wherein the first one of the external contacts is the negative contact, the positive power terminal is a first positive power terminal and the external portion thereof is a first positive contact, the housing including a second positive power terminal extending through the housing, a portion of the second positive power terminal being disposed externally of the housing and forming a second positive contact, the second positive contact being spacedly located at the first predetermined distance from the negative external contact adjacent the other side wall of the housing, the second predetermined distance being less than the first predetermined distance such that the power input terminal is located between the negative and one of the positive contacts of the battery pack, the for converting the voltage and for applying the converted voltage including a connector for applying the converted voltage to the second positive external contact of the battery pack.

61. A battery pack according to claim 46, wherein the power cell is a plurality of power cell elements, the housing including a frame for slidably receiving the power cell elements, and wherein the switch for converting the voltage at the positive terminals of the power cell and for applying the converted voltage to the positive external contact includes a voltage converter module, the voltage converter module having negative and positive input terminals and negative and positive output terminals, and disposed within the housing adjacent a base of the housing for electrically coupling the power cell elements in series, thereby forming the power cell with the combined voltage of each of the power cell elements, for coupling the negative and the positive terminals of the power cell to the respective input terminals of the voltage converter module, and for coupling the output terminals of the voltage converter module to the respective external contact of the battery pack.

62. A battery pack according to claim 59, wherein the housing further includes a frame for slidably receiving the voltage converter module, a fastener for coupling, said fastener including a resilient connector disposed adjacent an inner end of the frame for slidably receiving the voltage converter module for coupling the inserted voltage converter module to the fastener, and wherein the battery pack further includes a cap adapted to retain the power cell elements and the voltage converter module within the housing, the cap including portions of the fastener for coupling the power cell elements in series.

63. A battery pack according to claim 46, wherein:

the regulator comprises a voltage converter module having negative and positive input and output terminals; wherein said housing has spaced side walls, a base, an open end opposite the base, and a frame for receiving and for retaining the plurality of power cell elements and the voltage converter module within the housing; and further comprises a coupler for coupling the plurality of power cell elements in series, thereby providing, a power cell having the combined voltage of the elements and negative and positive output terminals, a first terminal coupler for coupling the negative and positive output terminals of the power cell to respective negative and positive input terminals of the voltage converter module, and a second terminal coupler for coupling the negative and positive output terminals of the voltage converter module to the respective negative and positive power contacts of the housing.

* * * * *